Sept. 10, 1946.   I. GURWICK   2,407,549
METHOD OF SURFACE COATING TISSUE PAPER WITH THERMO-RESPONSIVE RESINS
Filed March 11, 1943   2 Sheets-Sheet 2
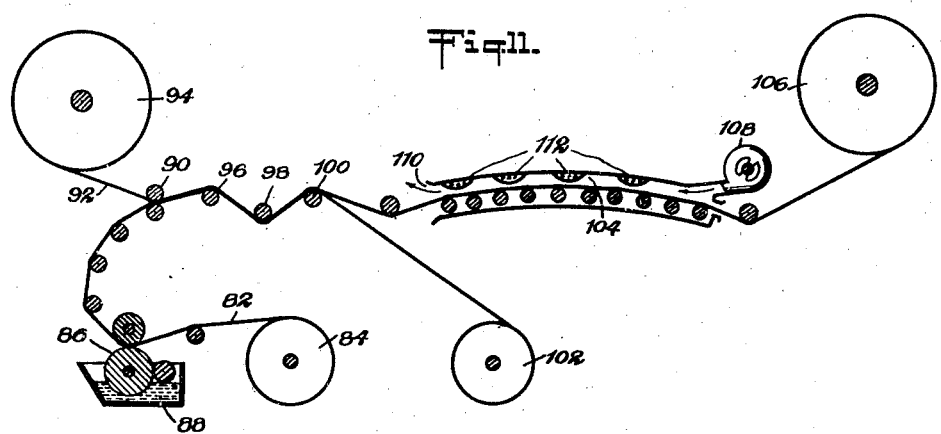
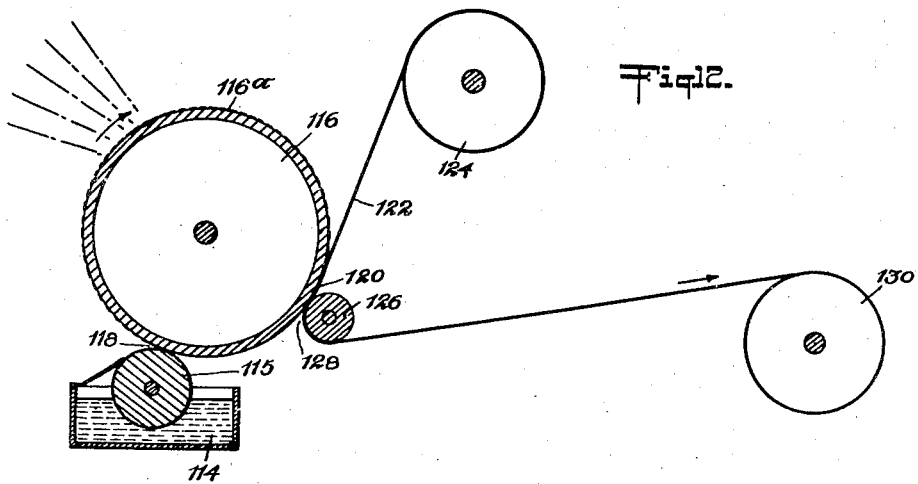
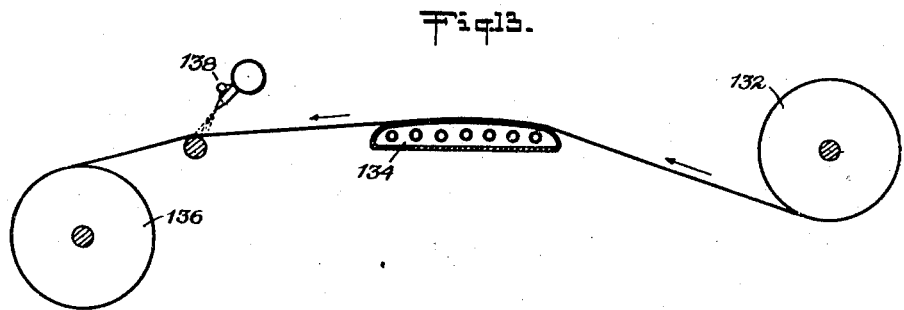
INVENTOR.
Irving Gurwick
BY
ATTORNEYS Patented Sept. 10, 1946

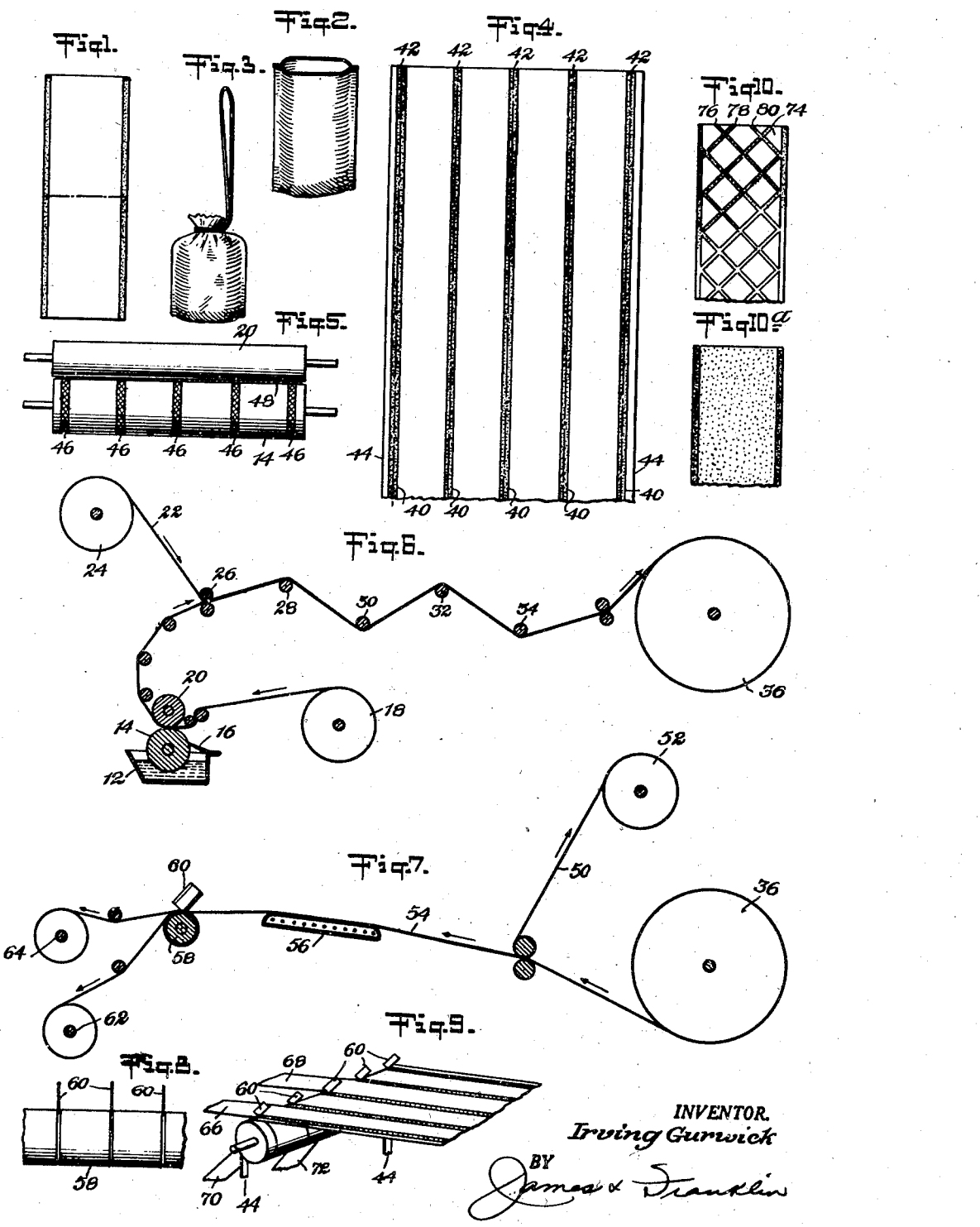

2,407,549

UNITED STATES PATENT OFFICE 2,407,549

METHOD OF SURFACE COATING TISSUE PAPER WITH THERMORESPONSIVE RESINS

Irving Gurwick, New York, N. Y.

Application March 11, 1943, Serial No. 478,820

6 Claims. (Cl. 154—97)

This invention relates to the surface coating of a porous paper such as tissue or filter paper with a thermo-responsive resin such as vinyl copolymer for the making of food containers such as tea bags.

The application or use of the method of the present invention for the making of tea bags is one of the important exemplifications of the principles thereof. Tea bags were first made of cloth, but more recently have been made of a high grade of permeable paper of adequate wet strength. The edges of these paper tea bags are stitched, although it is evident that they might more conveniently and economically be cemented. It has been attempted to apply to the surface of the paper a coating of a thermo-responsive, i. e., either a thermoplastic or a thermosetting, resin for the purpose of providing a cementitious sealing for the edges of the tea bags and for the purpose of increasing the wet strength of the paper. Such attempts, however, so far as I am aware, have not been successful.

There are a number of requisites for the making of an acceptable resin coated food container which is to serve as an infusion or filtration product such as a tea bag or a coffee bag. A major difficulty arises in applying the resin to the thin porous paper. The resin, particularly when applied as a resin solution, is readily absorbed into and even through the paper, and this leads to many difficulties. Impregnation of the resin solution into and through the paper fibres results in manufacturing difficulties; the paper becomes sticky on the opposite surface and the paper tends to stick to the impression roller on the opposite side of the coating roller, resulting in frequent tearing or breakage of the tissue or filter paper, this in turn requiring the apparatus to be shut down, the various rolls to be thoroughly cleaned, following which the paper must be threaded anew through the apparatus. Another major difficulty is that the coating film produced is too thick and is impervious or is in such a condition that it is difficult to render the same pervious, thus negativing the infusion or filtration characteristic desired for the product. A still further difficulty is that a very long drying procedure utilizing undesirable high temperatures must be used in an effort to drive off all of the solvent in the resin solution, this being most difficult to do when the resin solution has soaked into the paper. This latter difficulty is aggravated by the need for removing all of the residuary solvent to render the product odorless and tasteless. A further important desideratum is the use of a resin which may be used as a heat sealing means, that is, one sealed by the application of heat and pressure, the resulting union being water-proof as well as heat-proof. Various methods of applying resin to the paper have been attempted, but so far as I am aware, none of these have been successful in meeting these requirements, which are the desiderata for the making of an acceptable or successful product.

I have found that a thermo-responsive, such as a thermoplastic resin may be coated on the surface of a tissue or filter paper so that all of the foregoing desiderata are successfully attained. The resulting coating of the resin is localized superficially on the surface of the paper despite the porous and highly absorbent nature of the paper. This resin coating serves as the required heat sealing medium for the edges of the container product made from the paper. The resin coating is applied by relatively simple manufacturing steps which may be practiced so that the integrity of the paper texture and fibers may be fully retained. The resulting resin film or coating, while being in a fibre adherent condition is, nevertheless, discontinuous so as to form an open mesh which, therefore, at the same time increases the wet strength of the tissue paper and permits or retains the desired filtration or infusion characteristic of the paper. The resin coating is in such a condition when applied that all of the solvent may be removed without difficulty, producing an odorless or tasteless product. The method of surface coating a tissue paper with a thermo-responsive, such as a thermoplastic, resin for accomplishing these results is the prime object of my present invention.

I have found that a most suitable thermo-responsive resin for this purpose is a vinyl copolymer. In accordance with the method of the present invention, I first coat a film of a solution of a vinyl resin on a non-adherent carrier, that is to say, a carrier of the class consisting of Cellophane, glassine, or waxed paper. The carrier applied resin film is then treated to effect partial evaporation of the solvent, leaving the film partially dried and in a still tacky condition. The thus treated film on the carrier is then contacted with the tissue or filter paper. The carrier and the tissue paper are then separated, the resin coating thereby transferring from the carrier and becoming adheringly attached to the contacted surface of the tissue or filter paper. The residual solvent is then removed from the resin coated tissue paper and the resulting product is thereby produced.

This application is a continuation in part of my application Serial No. 445,414, filed June 2, 1942, for "Coating of porous material for container or the like," now abandoned.

To the accomplishment of the foregoing objects, and such other objects as may hereinafter appear, my invention consists in the porous paper containers and the process for making the same, and their relation one to the other, as hereinafter are more particularly described in the specification and sought to be defined in the claims. The specification is accompanied by drawings in which:

Fig. 1 illustrates a paper blank for a tea bag;
Fig. 2 shows the same folded and sealed;
Fig. 3 illustrates the filled and completed tea bag;
Fig. 4 shows a piece of striped web prior to slitting;
Fig. 5 is a schematic vertical section showing how the resin is applied in stripes;
Fig. 6 shows schematically how the tissue paper is laminated to a non-absorbent Cellophane web;
Fig. 7 schematically illustrates the separation of the laminations and the heating and slitting of the tissue paper web;
Fig. 8 is a fragmentary view explanatory of the slitting mechanism;
Fig. 9 is a perspective view showing the slitting of the striped web;
Fig. 10 shows a piece of narrow or slit web coated with a mesh of reinforcing stripes;
Fig. 10a is a similar view showing a web coated for an over-all or fine mesh;
Fig. 11 is a schematic vertical section showing a modified method of applying a resin coating to the tissue paper;
Fig. 12 is a schematic vertical section of a still further modification; and
Fig. 13 schematically shows a further step that may be used in the method of the invention.

Referring to the drawings, and more particularly to Fig. 6, where I show one of the ways of practicing the method of my present invention, I employ a bath 12 of vinyl resin. This is in liquid form, preferably dissolved in a highly volatile solvent such as acetone. The resin may be those known commercially as Vinylite copolymer resin made by Union Carbide & Carbon Corporation of New York city. These resins consist of vinyl chloride and vinyl acetate. A specific example is their VYHF resin, comprising 85% to 88% of vinyl chloride, and the balance vinyl acetate. Another similar coating, already dissolved, which may be used, is the coating compound G357C of the Gordon Lacey Chemical Products Company, of Long Island City, New York. The above are mentioned by way of exemplification, and not in limitation, of the invention.

The coating roller 14 shown in Fig. 6 is a gravure roller formed by knurling, etching, or other suitable process. It runs in the bath of resin solution, and is acted on by means of a doctor blade schematically indicated at 16. 18 represents a carrier, here in the form of a moving web or roll of material to which the vinyl resin is non-adherent. A very satisfactory material is plain, transparent regenerated cellulose, such as that sold commercially by the E. I. du Pont de Nemours Co., under the name Cellophane. However, glassine or wax paper may also be used. The web of Cellophane is fed between the roller 14 and a backing or impression roller 20, which ordinarily is made of rubber. The coated web is led around guide rollers for a distance sufficient to insure partial drying of the resin to a non-liquid, tacky condition. Over this distance, the carrier applied coating or film is thus treated to effect partial evaporation of the solvent leaving the film partially dried and in a still tacky condition. (At the same time, considerable of the solvent, all of which must eventually be eliminated, is removed.) The time needed depends on the rate of evaporation of the solvent, which in turn is affected by the weather. If desired, temperature and humidity control may be used to insure uniform drying time, or extra artificial drying means may be employed, ranging from the simple use of an electric fan, to more elaborate drying means including heaters. For all ordinary purposes the latter are not necessary, because the coating is thin, and the acetone solvent is volatile and dries rapidly.

The tissue or filter paper is also in the form of a moving web. The web 22 of tissue paper is supplied from a roll 24, and at the region of the roller 26 where the resin coated film on the non-adherent carrier is still tacky, it is laminated to the coated Cellophane web. No great laminating pressure is required, and special pressure rollers are unnecessary. In the present apparatus the laminated material is run over guide rollers 28, 30, 32 and 34, which are offset relative to one another, so that the laminated material runs in a zig-zag path. This will alone develop sufficient pressure for the present purpose. Thus, in this step of the process the laminating of the tissue paper to the resin film-coated carrier is solely by interfacial contact, that is to say, by direct face to face contact without any relative slide or wiping motion and with only relatively light laminating pressure. The laminated material is then wound up into a reel, indicated at 36.

For high-speed, economical production purposes, the webs employed are preferably of commercially available width far greater than that needed for a tea bag. Where it is only desired to coat the paper with sealing edges, the web may be coated with a plurality of spaced, parallel stripes, a limited number being illustrated at 40 in Fig. 4. Each stripe is twice the width desired for the marginal edge of the tea bag, and the stripes are spaced apart by the desired width of the tea bag, so that when the web is slit on the broken lines 42, a number of narrow webs are obtained. In this way the entire web is used except for marginal waste 44 at the edges of the main wide web. Fig. 5 shows how the gravure roller 14 is knurled or etched at the points 46, so as to apply the desired stripes to the Cellophane web 48 held between roller 14 and pressure roller 20.

After a suitable drying period, the roll 36 of laminated material is unwound and the laminations are separated, as shown in Fig. 7. The Cellophane web 50 is rewound at 52, and is available for repeated use. The tissue paper web 54 is preferably passed over a heating unit, schematically indicated at 56, in order to drive off any remaining solvent or volatile ingredients. This is readily done at moderate temperature because the resin coating is a superficial coating localized on the surface of the paper. There is no impregnation into the full body of the paper.

The web then passes through appropriate slitting means, here illustrated as comprising simply a grooved roller 58 cooperating with a series of spaced cutting blades or razor blades 60. These parts are also shown in Figs. 8 and 9. The resulting narrow webs are reeled, it being convenient to wind alternate webs on a shaft 62 while the intermediate webs are separately wound on a spaced shaft 64. This will also be clear from Fig. 9, showing how the webs 66 and 68 run off horizontally, while the webs 70 and 72 run downwardly.

It will be understood that each of the resulting narrow reels is later used to supply an appropriate packaging machine, which in turn performs operations of the general nature illustrated in Figs. 1, 2 and 3. Specifically, the narrow web is cut into lengths as shown in Fig. 1, and is folded to bring the coated edges together, as shown in Fig. 2. These edges are subjected to heat and pressure in order to heat-seal the resin. The bag is filled with a measured quantity of tea or other food product, and is closed at the top. In the case of a tea bag, it is unnecessary to seal the top, for it may be closed by the same string, which is anyway needed to suspend the same in the tea pot. It will be understood that when the bags are made and filled automatically, the measured quantity of tea may be deposited on the blank before the blank is folded and heat-sealed, instead of after. This depends on the nature of the particular bag-forming and filling machine used.

In the form of the invention just described, the vinyl resin has been used solely as a sealing medium. It may, however, also be used to increase the wet strength of an otherwise weak tissue paper. This is illustrated in Fig. 10, in which it will be seen that the narrow web 74 is crossed by intersecting stripes 76, 78, 80, etc. These form an open mesh, which does not prevent the desired filtration or diffusion, but which, nevertheless, functions to strengthen the paper.

It will be understood that the piece of web shown in Fig. 10 is a piece of the narrow or slit web, and that a single side web may be coated to form a considerable number of narrow webs. The only change needed is in the gravure roller 14, which should be appropriately etched to print the reinforcing lines or mesh, as well as the marginal sealing lines. The latter may be etched to greater depth, if a thicker sealing coat is wanted. It will also be understood that the number of reinforcing lines may be increased, thus making the mesh much finer than that illustrated in Fig. 10. For example, I may use a roller having a mesh of 100 to the inch.

In fact, the fineness of the mesh may be increased until the elements are practically infinitesimal in size, but for this purpose the process is preferably modified. Specifically, the entire web is preliminarily coated with a very thin superficial coating of resin. When this web is subjected to the final heating step illustrated in Fig. 7, the temperature is elevated enough not only to drive off residual volatile solvent, but also to actually melt or break down the resin coating. The coating tends to melt into the absorptive paper, thus breaking up the coating from a continuous surface to a highly perforate surface. The resin coating prior to this heat treatment is a very thin and superficial but continuous coating. The degree of heat necessary for this operation is only such as to cause the resin at the pores or interstices of the paper to break up and flow into the paper. The resin coating which exists over the paper fibres remains in a continuous condition, the applied heat effecting however, a partial penetration of this part of film, and, therefore, causing a more firm adherence thereof to the paper fibres. Thereby the wet strength of the paper is greatly increased by the resulting water-proofing of the fibres of the paper and thereby the desired infusion characteristics of the paper are retained by the breaking down or perforating of the resin film at the paper pores. If the paper were fully impregnated with resin the waterproofing would prevent disintegration and so increase the wet strength, but the desired open-mesh character of the paper would be lost. With my process the amount of resin available is so limited that on heating and absorption the film must break down at the pores of the paper, the gain in depth being lost in area.

The heat needed for this purpose is not at all excessive, and, therefore, does not damage the paper. This situation is to be contrasted with the condition which would exist if the original coating of resin were applied directly to the tissue paper (or if a thicker film or coating were applied), for in such case a much larger quantity of the resin solution would be required, and would be absorbed into the paper, and a much higher temperature would be needed to both drive out the solvent and to shrink and break up the impregnated film or resin, if it could be broken up at all into a perforate condition. In such case the temperature required, if workable at all, would be so high as to char and weaken the paper. There would also be the initial difficulty of the resin penetrating the paper and sticking to the backing roll.

Even when using my indirect coating process, it is important to employ the right thickness of film for best results, when seeking to improve the wet strength of the tissue as described above. If the film of vinyl resin deposited on the Cellophane and then transferred to the tissue paper, is too heavy, the resin will tend to clog the interstices between the fibres of the tissue paper, thus obstructing filtration and diffusion. If, on the other hand, the resin film used is too light, it may not add sufficiently to the wet strength of the paper. Another variable factor is the nature of the tissue paper itself. For many types I have found that the film deposited by using a gravure roller etched to a depth of $5/1000$ of an inch, is satisfactory. Different types of tissue paper may, however, have a different degree of openness between the intermatted fibres of the paper, and thus may require different amounts of the vinyl resin.

Reference has been made to filtration as well as diffusion. In a sense, a tea bag acts as a filter, but the present invention is applicable to filtration in a more direct sense, as for example, in drip-type coffee-makers. The wet strength of the filter paper used may be increased, as described above.

A modified form of apparatus involving a modification of the method is shown in Fig. 11 of the drawings. The main difference is that the laminated formation is not reeled up. In this form of the invention a Cellophane web carrier 82 is taken from a roll 84 and is coated at 86 with a film of the resin solution from the bath 88. Between the coating roller 86 and the pressure rolls 90, the resin film on the moving web 92 is treated as before to effect partial evaporation of the solvent in the resin, leaving the film partially dried and in a still tacky condition in the region of the pressure rolls 90. Here the thus treated resin film is contacted with the tissue paper web 92 taken from a roll 94 and the two are run together as a laminated assembly between the staggered rolls 90, 96, 98 and 100. The two webs are then separated, the carrier web 82 being reeled up at 102 and the tissue paper web being passed through a drying tunnel 104 and then reeled up at 106. In separating the carrier and the tissue paper the resin coating transfers from the carrier and becomes adheringly attached to the contacted surface of the tissue paper. The residual solvent in the resin film (or the solvent which has become absorbed in the fibres of the tissue paper) is completely removed in the drying tunnel 104. In this drying tunnel, air movement or heat, or both, may be used to dry the paper web. For example, a blower 108 may be connected at the discharge end of the tunnel and may be used to blow a stream of air through the tunnel and out through the open inlet 110. Electrical heating units 112 may be disposed along the top of the tunnel. Either or both of these expedients may be used, and the air velocity and temperature required depends almost wholly on the desired speed of movement of the coated web. Where the entire surface of the tissue paper web has been transfer coated, the heat in the tunnel 104 is such as to effect the dual result of perforating the coating and causing the particles to melt and adhere to the paper fibres, thereby accomplishing the dual function of increasing the wet strength of the paper and producing a perforate coating and, therefore, a filtration and infusion resin coating characteristic.

In the form of the invention described in connection with Figs. 6 and 7, the laminated assembly between the operations of Fig. 6 and Fig. 7 may be set aside to age. Such aging may take anywhere from a few hours to two or three days. The aging causes a certain amount of the solvent in the resinous film to be absorbed by the paper and become dissipated by the film itself, so that on the subsequent heating the solvent dissipates very readily at a low temperature.

This aging step may also be practiced with the method described in connection with Fig. 11 of the drawings. In doing so, the heating step depicted for Fig. 11 is carried out at a relatively lower temperature, the heating being just sufficient to cause a goodly portion of the residual solvent to be driven off and to cause a firmer anchorage of the resin film on to the paper fibres. The paper roll 106 is then set aside to age. This aging causes the remainder of the solvent in the resinous film to be absorbed by the paper fibres and to become otherwise dissipated by the film itself. Thereafter, this roll may be unreeled and passed over one or more heating units according to the step depicted in Fig. 7 of the drawings. This final heating stage functions to effect the breaking up or perforating of the resin film and the driving off of the remaining solvents present. By utilizing these two heating steps, the desired result may be effected with the employment of low temperatures in each of the heating steps. This aging step may also be employed to carry out the method of Fig. 11 by eliminating the heating in carrying out the step of Fig. 11, deferring the same until after the paper has been reeled up and aged. In this latter event the heating step after the aging is carried out at such temperatures (also moderate) as will effect the dual function of driving off all of the residuary solvent and of breaking up the continuous resin film into the perforate film described.

The importance of being able to use low temperatures and low pressures throughout the practice of the process in its various modifications is evident. Tissue or porous paper is a relatively weak structure and one which is not capable of being treated, without some damage to the paper structure, at high temperatures or high pressures. In the practice of the process, therefore, the transfer of the resin film and the complete elimination of the solvents is accomplished simply and in a practical way with low pressures and temperatures and also both quickly in point of time and rapidly in point of apparatus space. A further important consideration in being able to do all this at the low temperatures is elimination of fire and explosive hazards in dealing with the particular products involved.

In Fig. 12 of the drawings, I show how the invention may be practiced with a non-adherent character of a different form, namely, in the form of a transfer roll. Here the resin solution in the bath 114 is coated by means of a steel engraved roll 115 on to a large diameter transfer roll 116. This transfer roll may comprise a rubber roll with a non-compatible or non-adherent facing 116ᵃ made of gelatine, wax, etc., the roll thus having a cushioning base and the desired non-adherent facing. Between the point of application 118 (of the resin coating to the transfer roll) and the region 120, the resin solution film applied to the transfer roll is treated to effect partial evaporation of the solvent, leaving the film at the region 120 partially dried and in a still tacky condition. At the region of point 120 the thus treated film on the transfer roll 116 is contacted with a web of tissue paper 122 taken from the roll 124, the contact being between the transfer roll 116 and a pressure roll 126. At the point of emergence 128 where the web of tissue paper separates from the transfer roll, the resin coating on the transfer roll leaves the latter and becomes adheringly attached to the contacted surface of the tissue paper, the tissue paper web being then wound up into the reel 130. If desired, the residual solvent in the transferred resin coating may be removed between the pressure roll 126 and the reel 130 in the manner aforedescribed, or the reel 130 may be set aside to age and may thereafter be passed through a heating tunnel or over a heating means in the manner aforedescribed in connection with Fig. 11 or Fig. 7 of the drawings for effecting the removal of the residual solvent from either the resin coating or the resin coated tissue paper and for effecting the breaking up of the film into a discontinuous paper fibre adherent perforate condition.

In Fig. 13 of the drawings, I show a further operating step that is sometimes desirable in this last mentioned stage of the process. Here the reel 132 of tissue paper, after the aging operation, is unreeled and passed over the heater 134 and re-reeled at 136. At the point of re-reeling, the paper is subjected to the application of a water spray coming from the spray device 138. I have found that sometimes the fine tissue paper may become embrittled by the last heating step when moved over the heater 134. To re-introduce the desired flexibility of the paper and to remove the brittleness, I have found it efficacious to use a very fine spray of water on the reeling paper, just about at the point where it is being finally reeled up. The water becomes absorbed throughout the paper fibres and re-imparts the desired flexibility to the paper.

The practice of the method of the present invention, the nature of the products produced thereby and the advantages thereof will in the main be fully apparent from the above detailed description thereof. It will also be apparent that while I have shown and described the invention in a number of preferred forms, many changes and modifications may be made, without departing from the spirit of the invention as sought to be defined in the appended claims. While particular vinyl co-polymers have been found to be most effective, other thermoplastic resin solutions or thermosetting resin solutions may be substituted therefor. The resin used may be pigmented, thereby coloring as well as coating the paper web. Cellophane and glassine webs have been found quite efficient; and waxed paper may be also effectively used. Waxed paper when used should desirably not be subjected to heat; air drying should be used before laminating the same with the porous web; of course, heat may be applied to the porous web after it has been separated from the waxed paper web. A cloth fabric having the same characteristics and presenting the same problems as a tissue or filter paper may be similarly coated; the invention is of particular advantage and unique value with very soft, porous, or highly absorbent materials.

I claim:

1. The method of surface coating a tissue paper with a thermo-responsive resin, which consists in first coating a thin film of a solution of the resin on a non-adherent carrier, in treating the carrier applied film to effect partial evaporation of the solvent leaving the film partially dried and in a still tacky condition, in then engaging solely by interfacial contact the thus treated film on the carrier with the tissue paper, in then separating the carrier and the tissue paper, the resin film thereby transferring from the carrier and becoming adheringly attached as a thin superficial film to the contacted surface of the tissue paper, and in then heating the resin coated tissue paper and breaking down the continuity of the resin film to form an open mesh which increases the wet strength of the tissue paper without sealing it against filtration or infusing.

2. The method of surface coating a tissue paper with a thermo-responsive resin, which consists in first coating a thin film of a solution of the resin on a non-adherent carrier, in treating the carrier applied film to effect partial evaporation of the solvent leaving the film partially dried and in a still tacky condition, in then engaging solely by interfacial contact the thus treated film on the carrier with the tissue paper, in then separating the carrier and the tissue paper, the resin film thereby transferring from the carrier and becoming adheringly attached as a thin superficial film to the contacted surface of the tissue paper, and in then heating the resin coated tissue paper, thereby driving off any residual solvent and breaking down the continuity of the resin film to form an open mesh film which increases the wet strength of the tissue paper.

3. The continuous method of surface coating a web of tissue paper with a thermo-responsive resin, which consists in first coating a thin film of a solution of the resin on a moving non-adherent web carrier, in treating the applied film on the moving carrier to effect partial evaporation of the solvent leaving the film partially dried and in a still tacky condition, in then laminating solely by interfacial contact the moving web carrier with a moving web of tissue paper with the thus treated film on the carrier contacting the tissue paper, in then aging the laminated assembly, thereafter separating the web carrier and the web of tissue paper, the resin film thereby transferring from the web carrier and becoming adheringly attached a thin superficial film to the contacted surface of the web of tissue paper, and in then heating the resin coated tissue paper, thereby driving off any residual solvent and thereby breaking down the continuity of the resin film to form an open mesh which increases the wet strength of the tissue paper without sealing it against filtration or infusion.

4. The method of applying to a tissue paper web a porous thermo-responsive resin film which consists in first applying on to the tissue paper web a very thin superficial film of a thermo-responsive resin derived from a solution of the resin, and in then heating the tissue paper web and applied film thereby breaking down the continuity of the resin film at the pores of the tissue paper web and thereby forming a porous or perforate resin film on the tissue paper web.

5. The method of applying to a tissue paper web a porous thermo-responsive resin film which consists in first applying onto the tissue paper web a very thin superficial film of a thermoresponsive resin derived from a solution of the resin and which is still in a tacky condition, and in then heating the tissue paper web and applied film thereby removing residual solvent from the resin film and thereby breaking down the continuity of the resin film at the pores of the tissue paper web and thereby causing the resin film to become more adheringly attached to the fibres of the paper and producing a porous or perforate resin film on the tissue paper.

6. The method of applying to a tissue paper web a porous thermo-responsive resin film which consists in first applying onto the tissue paper web a very thin superficial continuous film of a vinyl copolymer resin derived from a solution of the resin, and in then heating the tissue paper web and applied film thereby breaking down the continuity of the resin film at the pores of the porous web and thereby causing the resin film to become more adheringly attached to the fibres of the paper and thereby forming an adherent porous or perforate resin film on the tissue paper.

IRVING GURWICK.